United States Patent
Fair et al.

(10) Patent No.: US 7,080,939 B1
(45) Date of Patent: Jul. 25, 2006

(54) POLYMERIC THERMAL HISTORY SENSOR

(75) Inventors: Geoff E. Fair, Centerville, OH (US); Triplicane A. Parthasarathy, Beavercreek, OH (US); Ronald J. Kerans, Yellow Springs, OH (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 122 days.

(21) Appl. No.: 10/963,008

(22) Filed: Oct. 4, 2004

(51) Int. Cl.
*G01K 3/04* (2006.01)
*G01K 11/16* (2006.01)

(52) U.S. Cl. ............... 374/102; 374/162; 374/101; 374/161; 374/159; 116/216; 422/55; 422/82.05

(58) Field of Classification Search ........ 374/101–104, 374/106, 110, 112, 161, 162, 159, 208; 116/200, 116/206, 216; 428/701; 422/55, 57–58, 422/61, 82.05, 82.09, 82.12, 83
See application file for complete search history.

(56) References Cited

U.S. PATENT DOCUMENTS

| | | | |
|---|---|---|---|
| 3,065,083 A | 11/1962 | Gessler | |
| 3,954,011 A | 5/1976 | Manske | |
| 4,064,872 A * | 12/1977 | Caplan | 374/162 |
| 4,188,437 A * | 2/1980 | Rohowetz | 428/199 |
| 4,195,058 A * | 3/1980 | Patel | 422/56 |
| 4,212,153 A * | 7/1980 | Kydonieus et al. | 368/62 |
| 4,362,645 A * | 12/1982 | Hof et al. | 252/408.1 |
| 4,389,217 A * | 6/1983 | Baughman et al. | 436/2 |
| 4,428,321 A * | 1/1984 | Arens | 116/217 |
| 4,753,188 A * | 6/1988 | Schmoegner | 116/217 |
| 4,933,525 A * | 6/1990 | St. Phillips | 219/725 |
| 5,053,339 A | 10/1991 | Patel | |
| 5,476,792 A * | 12/1995 | Ezrielev et al. | 436/1 |
| 5,667,303 A | 9/1997 | Arens et al. | |
| 5,709,472 A * | 1/1998 | Prusik et al. | 374/106 |
| 6,435,128 B1 * | 8/2002 | Qiu et al. | 116/207 |
| 6,452,873 B1 * | 9/2002 | Holt et al. | 368/327 |
| 6,514,462 B1 * | 2/2003 | Simons | 422/82.12 |
| 6,524,000 B1 * | 2/2003 | Roth | 374/102 |
| 6,737,274 B1 | 5/2004 | Wright | |
| 6,741,523 B1 * | 5/2004 | Bommarito et al. | 368/327 |
| 6,916,116 B1 * | 7/2005 | Diekmann et al. | 374/102 |

(Continued)

FOREIGN PATENT DOCUMENTS

JP 05045313 A * 2/1993

OTHER PUBLICATIONS

Labuza, Dr. Ted, "Smart Labels," slide presentation posted on University of Minnesota website, http://faculty.che.umn.edu/fscn/Ted_Labuza/tpl-papers-Talks.html (2003).

*Primary Examiner*—Gail Verbitsky
(74) *Attorney, Agent, or Firm*—AFMCLO/JAZ; Steve Sayeedi

(57) ABSTRACT

An improved thermal history sensor having multiple polymeric substrates with unique compositions is disclosed. By positioning the sensor adjacent to an item subject to thermal stressors, each of the polymeric substrates react with a different rate of crystallization and thus yield a specific measure of infrared (IR) absorption spectra, for example. By comparing these measurements for each polymeric substrate, a thermal history fingerprint may be obtained. This thermal history fingerprint may then be compared to baseline data to yield information about the item, such as the expected remaining useful lifetime of the item.

20 Claims, 1 Drawing Sheet

U.S. PATENT DOCUMENTS

| | | | |
|---|---|---|---|
| 6,974,249 B1 * | 12/2005 | Fair et al. | 374/102 |
| 6,979,120 B1 * | 12/2005 | Wolfe | 374/162 |
| 2002/0167989 A1 * | 11/2002 | Russo | 374/141 |
| 2004/0184948 A1 * | 9/2004 | Rakow et al. | 422/1 |
| 2005/0186244 A1 * | 8/2005 | Hunter et al. | 424/423 |

* cited by examiner

POLYMERIC THERMAL HISTORY SENSOR

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention relates to the field of thermal exposure, and in particular, determining the thermal history of items and the effects thereof.

2. Description of the Related Art

Consumer goods and products exposed to a variety of temperatures for various periods of time generally suffer degradation in their properties or their suitability for their intended uses or functions. The higher the temperature and the longer the exposure, particularly to higher temperatures, the greater the likelihood of unsatisfactory degradation. This is true for a variety of products, including drugs and other medicines, foods, electronics, munitions and a wide assortment of consumer products, chemicals and compounds— including, for example, batteries, photographic materials, paints, glues, solvents, cleaners, and the like. Effects of temperature exposure on perishable foods and drugs are particularly important.

Unsatisfactory degradation can result in spoiled foods, ineffective medicines, or malfunctioning items, for example. Unfortunately, degradation from thermal exposure can occur under many circumstances. Food items, for example, can spoil at any of various stages from the point of manufacture to use by the consumer. Thermal degradation of products can harm the manufacturer as well as the consumer. A consumer who purchases spoiled food, for example, may avoid that brand in the future. It is therefore important for manufacturers to minimize thermal degradation in their products. As part of this process, it is important for manufacturers to have sufficient knowledge of the types of thermal exposures their products typically experience.

One method manufacturers typically use to help avoid unsatisfactory degradation is date stamping—the labeling of a product with a date, such as the date of manufacture or expiration. Oftentimes, thermal and related stressors, such as direct sunlight, account for the most serious effects of product degradation. Unfortunately, these effects often vary considerably at different times of the year, or even at different times of the same month, and in different geographic locations. Date stamping cannot accurately assess the degree or rate of degradation. Indeed, date stamping can indicate that a perfectly good product should be discarded or that a spoiled product is still good. Accordingly, date stamping is ineffective at accurately assessing the remaining lifetime of an item.

Another drawback to date stamping is that it does not provide sufficient information to determine the cause or responsible party of a spoiled or otherwise degraded product. Because thermal exposures occur at a wide variety of different times and in different circumstances, it is often difficult to assess the cause of product degradation. A food product, for example, may spoil prematurely because it sat too long or at too high of a temperature in either a warehouse, in a distributor's truck, on the retailer's shelf, or even in the consumer's pantry. It is desirable to determine when and where the degradation occurred. By way of example, a manufacturer should not be held liable for product degradation that occurred while it sat in a distributor's warehouse.

A number of efforts have been made to account for the effect of high temperatures and to assess whether such temperatures have yet been reached. These techniques offer a sensor that acts like a fuse, indicating if it has been exposed to a specific temperature. Further efforts have resulted in the development and use of a variety of other temperature sensors, such as Time Temperature Indicators. These sensors are sensitive to both time and temperature. The sensor typically may be visually inspected to determine whether a product has yet degraded past a certain point. This helps each party transferring possession of an item to obtain better information, upon inspection, whether it is still good and thus helps determine the responsible party for spoiled goods, for example.

While such techniques may be useful for indicating that an item was exposed to a specific temperature, they generally do not reveal by how much the specific temperature was exceeded or for how long the item was exposed to any given temperature—both of which can be important factors in determining the expected remaining useful lifetime of the item. Indeed, in some cases, the time of exposure at a specific temperature can be as important or an even more important factor in determining the useful lifetime of an item as the specific temperature of exposure itself. Such devices are typically not very precise, and like date stamping, may erroneously indicate that a good product is spoiled or that a spoiled product is good.

Other sensors have been developed in an effort to provide information on the length of exposure at a particular temperature. These inventions disclose a sensor that indicates exposure to a specific temperature for a pre-determined length of time. However, these techniques provide little, if any, information about intermediate temperature exposure once the item has been exposed to higher temperatures.

All of these sensors, while much more useful than date stamping, have some disadvantages. One disadvantage, for example, is that they are not re-usable and a new sensor must be used for each application. These sensors rely on an irreversible process to indicate changes in time or temperature. With large shipments, the cost of using a new sensor for each item can be considerable. In addition, they do not provide information as to when a specific temperature exposure occurred; rather, they may be capable only of providing information as to whether a specific temperature exposure occurred. That is, there is no way to determine when a thermal exposure occurred once a sensor indicates a pre-determined thermal exposure has occurred.

Another disadvantage is that there is no way to determine the sequence in which different thermal exposures occurred. This information, if available, would allow one to determine who was responsible for a given thermal exposure. Such information would also provide a more accurate determination of the expected remaining lifetime of an item. This is because a product may last significantly longer if it was exposed to a specific temperature recently than it would if it was exposed to the same temperature less recently.

Another important disadvantage of these sensors is that they generally cannot be used interchangeably with different items. Because these sensors respond directly to thermal exposures themselves, it is difficult to tailor the indicator to a specific item or product. In other words, the sensor responds to a predetermined set of thermal exposures and therefore cannot be used interchangeably with different items. For example, a sensor that indicates one item is no longer fresh after being exposed to temperature in excess of 100° F. would not be appropriate for use with an item that maintains its freshness until exposed to temperatures in excess of 120° F. the sensor must be sensitive to the same thermal stressors as the item of interest, which makes the design of such sensors difficult for a wide variety of manufactured items.

Accordingly, there is a need for an improved method and sensor for accurately obtaining the thermal history of an item. In particular, there is a need for determining when an item has been exposed to specific temperatures, thereby providing information as to how long such exposures occurred, in what order they occurred, who was responsible for such exposures, and the expected remaining lifetime of an item or, if the item is no longer suitable, the exposures which caused its degradation and the times such exposures occurred.

SUMMARY OF THE INVENTION

An object of the invention is to provide an improved method and sensor for determining the thermal history of an item, thereby obtaining information about the expected remaining lifetime of the item and the party or parties responsible for degradation of the item.

Another object of the invention is to provide a relatively inexpensive and re-usable sensor that can be positioned adjacent to an item in order to obtain information about the thermal history of that item.

Another object of the invention is to provide a means for determining the time of thermal exposure after the exposure has occurred so that information about the thermal exposure, including the responsible party therefore, can be determined without having to examine the sensor at or near the time of transfer of possession.

Another object of the invention is to provide a convenient means for reading a thermal history sensor and comparing it to baseline data to obtain accurate information about the thermal history of an item, such as its expected remaining lifetime.

Another object of the invention is to provide a means for informing manufacturers of the thermal exposures and transit times their products experience between manufacturing and ultimate use or consumption.

Yet another object of the invention is to provide a sensor that can be tailored to a variety of different items, even those that exhibit different effects from the same thermal exposures.

To meet these and other objects, the present invention provides a sensor for determining the thermal history of an item (such as a consumer product, for example) subject to thermal exposure.

The sensor contains a set of different polymeric films or substrates. The infrared (IR) absorption spectra and, in some cases, the visual absorption or transmittance of these materials correlates with the degree of crystallization of the polymer, which in turn depends on the thermal conditioning of the materials. The sensor is positioned adjacent to the item of interest, and because the sensor is exposed to essentially the same thermal conditioning as the item itself, the sensor can reveal important information about the thermal history of the item.

The sensor initially contains substrates in the amorphous state. Thereafter, each polymeric substrate of the sensor will undergo crystallization in response to thermal exposure. By exposing the sensor to a thermal stressor, each substrate—having a unique composition—responds with a different degree of crystallization. This difference results in different IR absorption spectra. By measuring the different IR absorption spectra for each polymeric substrate, a fingerprint is obtained corresponding to the thermal history of the adjacent item. This technique of obtaining thermal history fingerprints is described in U.S. patent application Ser. No. 10/801,294, filed 17 Mar. 2004, and is hereby incorporated herein by reference.

The sensor is most effective for use with temperature exposures varying from approximately 20° C. (twenty degrees Celsius) to approximately 250° C. The sensor may be re-used after quenching the substrates by exposing them to sufficiently high temperatures.

A reflective surface, for IR wavelengths, may be positioned under the polymeric substrates to allow infrared light, directed through the substrates, to be reflected back through the same substrates in order to facilitate the measurement. Alternatively, an IR transparent surface may be used to facilitate measurement in some cases, such as where the sensor is removed from the item and passed through a measurement device. A variety of materials may be applied to the sensor, such as adhesive layer, for example, to attach to the item of interest. A hand held device, such as those similar to standard bar code readers, may be used to simultaneously measure the IR absorption spectra of each polymeric substrate.

An improved thermal history sensor having multiple polymeric substrates with unique compositions is disclosed. By positioning the sensor adjacent to an item, each polymeric substrate reacts with a unique change in crystallinity. This in turn can be measured by the resulting difference in IR absorption spectra. By comparing the measured values, representing a thermal history fingerprint of the item, to baseline data—which includes a series of thermal history fingerprints and corresponding data regarding the specific nature of the item (typically stored in a database), valuable information about the item, such as its expected remaining lifetime, for example, may be obtained.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

While the specification concludes with claims particularly pointing out and distinctly claiming that which is regarded as the present invention, the features, objects, and advantages of the present invention can be more readily ascertained with reference to the following description, in conjunction with the accompanying drawing, in which:

DETAILED DESCRIPTION

Figure 1:
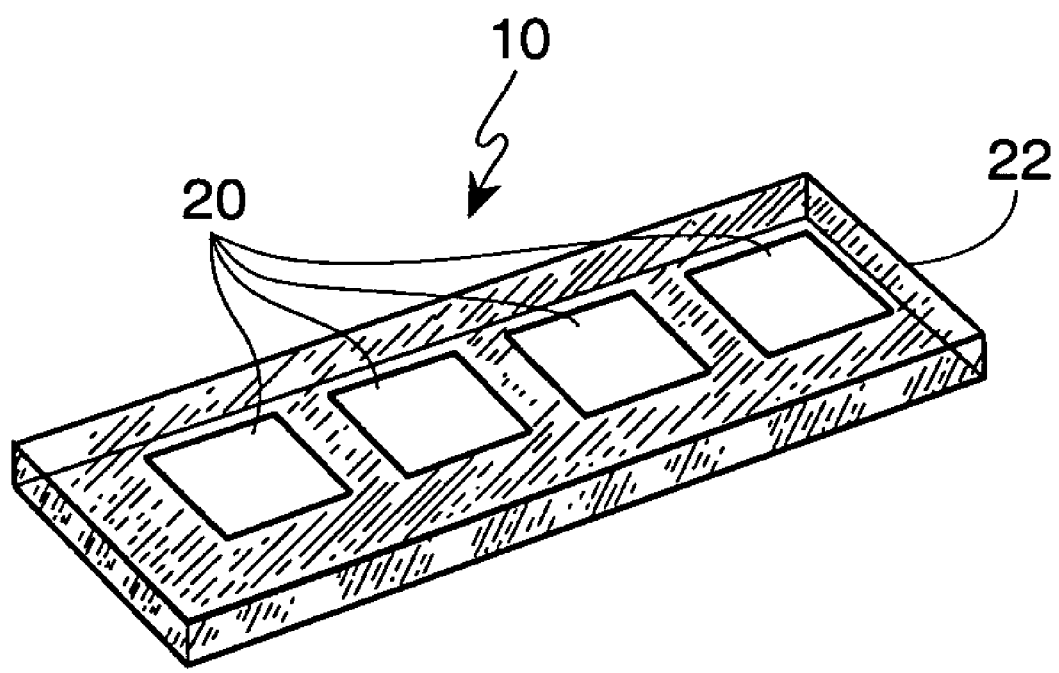
FIG. 1 is a perspective view of one embodiment of the thermal history sensor.

Referring to the drawing, FIG. 1 depicts one embodiment of the sensor 10. This particular embodiment includes four different polymeric substrates 20 secured to a surface 22. In this embodiment, the polymeric substrates 20 are equally sized and spaced and are positioned linearly (single row array) within the same plane. An alternative embodiment of the sensor 10, in which the polymeric substrates 20 are arranged in a multi-dimensional array, for example, may be used as desired. In one embodiment, all of the polymeric substrates 20 have the same dimensions—as well as having approximately equal height and width (i.e., substantially square), though this is not essential. In one embodiment, the polymeric substrates 20 measure approximately six millimeters square and less than one millimeter in thickness.

The sensor 10 includes at least two polymeric substrates 20 having different compositions. In one embodiment, no two polymeric substrates 20 of the sensor 10 have the same material composition. Accordingly, each polymeric substrate 20 responds with different crystallization effects, after exposure to a specific temperature for a specific time, and therefore possesses a unique IR absorption spectra. Polymeric substrates 20 may initially (prior to first use) be amorphous—that is, they have been quenched or have not yet been exposed to a sufficiently high temperature to cause crystallization.

Though IR absorption spectra is measured in typical embodiments, any unique change in each polymeric substrate 20 to changes in thermal exposure, capable of being measured, may be utilized in alternative embodiments. Because thermal exposure causes changes in crystallinity, for example, the crystallinity of each polymeric substrate 20 may be measured directly or indirectly. This may be accomplished through measurement of, for example, IR absorption spectra, visual light absorption or visual light transmittance.

The polymeric substrates 20 may be formed from any of a wide variety of different compositions, such as polyamides (e.g., polyamide-6,6), polyethylene, polyalkene, terephthalates (e.g., polybutylene terephthalate), polyesters (e.g, polyester 12,12) or poly(alkylethylene)s (e.g., poly(1-ethylethylene)), for example. Each such composition exhibits a unique infrared (IR) absorption spectra which depends on the degree of crystallization as a consequence of thermal exposure. Specifically, the IR absorption peaks due to regularly ordered or crystalline regions appear to sharpen as the material crystallizes while those absorptions corresponding to the amorphous regions of the sample decrease in intensity.

The polymeric substrates 20 may be fastened together with a wide variety of different materials as is appropriate for the item of interest (not shown). For example, a flexible strip with adhesive (not shown) may be used to secure the polymeric substrates 20 together and attach the sensor 10 to the adjacent item.

Any desired number of sensors 10 may be positioned adjacent to items (not shown) for which the thermal history is desired. The term "adjacent" includes any positioning of the sensor 10 within sufficient proximity to the item of interest such that both are exposed to the same or substantially similar thermal stressors, including situations where the sensor 10 is physically attached or secured to the item. In one embodiment, the sensor 10 is secured to an item with adhesive. In another embodiment, the sensor 10 is held in place on an item's outer packaging by a laminate or other coating process. Other attachment means, such as rivets, screws, bolts, welding, or any other method capable of withstanding the expected temperature stressors may be used as appropriate.

The sensor 10 may be used in conjunction with other indicating means, such as a date stamp or temperature fuse-type indicator, where appropriate. In some situations, increasingly accurate data about the expected remaining useful lifetime of an item and the storage environment may be obtained from using multiple sensors 10 positioned adjacent to the same item or items. For example, sensors 10 may be attached to both the inside and outside of a shipment container (not shown). In one embodiment, an item is outfitted with several different sensors 10 so that all of the thermal history fingerprints from each individual sensor 10 is combined to form a larger thermal history fingerprint for the item.

Once the sensor 10 is exposed to a temperature between $T_g$ (glass transition temperature) and $T_m$ (crystalline melting temperature), the sensor 10 will provide the thermal history of the item (not shown) positioned adjacent to it. That is, the sensor 10 will provide valuable thermal history data for the adjacent item once it has been exposed at least once to a temperature greater than $T_g$, as long as it has never subsequently been exposed to a temperature greater than $T_m$. The temperatures $T_g$ and $T_m$ can readily be determined for any given polymeric substrate 20 through methods known in the art.

The mounting surface 22 may be formed from a heat resistant material, or alternatively, may be a coating, having IR reflective or transparent characteristics. The IR reflective mounting surface 22 may be positioned under each polymeric substrate 20 so that IR radiation directed through each polymeric substrate 20 at a specific angle may be reflected back though the same polymeric substrate 20 in order to measure the IR absorption spectra of the polymeric substrate 20. In preferred embodiments, the mounting surface or surfaces 22 and polymeric substrates 20 are positioned such that IR radiation may be directed at the same angle or angles through each of the polymeric substrates 20 in order to obtain readings for each polymeric substrate 20. This allows a bar code type reader (not shown), for example, to simultaneously direct light through each polymeric substrate 20, thereby obtaining the measurements for each of the polymeric substrates 20 at one time.

The more polymeric substrates 20 used in the sensor 10, the more information will be revealed about the thermal history of the adjacent item. This increased information comes at a cost of added complexity, however. The ideal number of polymeric substrates 20, which depends on the choice of compositions, will provide the minimum amount of thermal history necessary for a given item. Typically, the sensor 10 includes between about four and about 36 polymeric substrates 20.

The IR absorption spectra for each polymeric substrate 20, which bears a strong correlation to the fraction of crystallization or solutionization, is typically classified into one of several ranges, from zero (amorphous) to ten (crystallized), for example. In other embodiments, a single value is used instead of a range of values. The ideal number of value ranges will again be the minimum number necessary to yield sufficient thermal history for a given item.

By way of example, the sensor 10 of FIG. 1 initially reads "0-0-0-0." That is, all four polymeric substrates 20 are amorphous. After exposing the sensor 10 to a temperature greater than $T_g$, the reading will be some non-zero value, such as "3-8-0-2," for example. Each number being determined, for example, by the IR absorption spectra for the individual polymeric substrate 20. In general terms, for this example, the reading corresponds to the fraction of crystallization of the first polymeric substrate 20 of between 20–30 percent, the second polymeric substrate 20 of between 70–80 percent, et cetera. This reading, for any given number of polymeric substrates 20 and desired number of ranges representing the measurement of IR absorption spectra, provides a thermal history fingerprint. This fingerprint therefore consists simply of a series of values, typically numbers (one number for each polymeric substrate 20), where each value corresponds to the measurement of the IR absorption spectra for that particular polymeric substrate 20.

The sensor 10 and the item of interest, or sample thereof, may be subjected simultaneously to a variety of thermal stressors. The corresponding fingerprints may then be recorded, along with useful information about the resulting degradation, such as the expected remaining lifetime of the item, for example, using procedures known by those skilled in the art. This data can be generated by subjecting the item to thermal stressors in a controlled environment, such as a laboratory, as well as from actual testing or operational use. The resulting baseline data, which may readily be stored in a database, for example, can then be used as a benchmark for comparing future thermal history fingerprints.

Once the baseline data is sufficiently complete, the measurement (or thermal history fingerprint) from the sensor 10, positioned adjacent to an item, can then be compared to the baseline data to yield the thermal history of the actual item of interest. The comparison is typically made using any of a variety of known computational techniques. Baseline data can be calculated for the particular characteristics of any item of interest. The sensor 10 can then be used for any such item by simply comparing the measurements to the appropriate baseline data.

According to one embodiment, the sensor 10 is secured to a shipping container containing food items. The sensor 10 is positioned near a scannable product identification, such as a Universal Product Code (UPC) barcode. At each stage of transit, the sensor 10 passes a fixed or hand-held measuring device which reads both the sensor 10 and the UPC and stores the information in a computer. A wholesale distributor, for example, would then have a record of the thermal history of each shipping container. This information may be relayed to the manufacturer. If the thermal history reading indicates the shipping container likely contains spoiled items, the shipping container can be appropriately identified and therefore prevented from being passed on to the retailer.

Similarly, the sensor 10 can be positioned on smaller packages within the larger shipping container to identify, for the retailer, the thermal history of the items. The retailer can scan the item using a hand-held device (not shown), for example, prior to placing the items on the retail shelves.

In one embodiment, the output consists of the expected remaining useful lifetime of the item, measured in days. In another embodiment, a simpler output is produced consisting, for example, of a "red," "yellow," or "green" light—indicating that the item "is not fit for consumption," "may be appropriate for consumption," or "is fresh," respectively. Items that have been exposed to excessive temperatures or times can be returned to the manufacturer instead of being used by or sold to the consumer.

If desired, the sensor 10 may be removed from the adjacent item or container and returned to the manufacturer. For those items that experienced unsatisfactory degradation, the manufacturer can determine the principal cause of the degradation. In addition to providing a great deal of information about the time and temperature history experienced by its products, the sensor 10 may be re-used.

A variety of alternative embodiments may be constructed to achieve the objects of the invention. For example, the sensor 10 may be removed from its environment adjacent to an item where a device is used to measure the IR absorption spectra for each polymeric substrate 20 without the need for an IR reflective mounting surface 22. In another example, an IR source (not shown) is positioned near the sensor 10 so as to allow in situ measurements, which can then be transmitted to a remote receiver. This could allow, for example, the operator of complex machinery to be alerted of a thermally degraded item before the item actually fails or causes damage.

Characteristics of the described and illustrated embodiments are intended for illustrative purposes and are not to be considered limiting or restrictive. It is to be understood that various adaptations and modifications may be made to the embodiments presented herein by those skilled in the art without departing from the spirit and scope of the invention, as defined by the following claims and equivalents thereof.

We claim:

1. A thermal history sensor, comprising a plurality of polymeric substrates positioned adjacent to an item, wherein said polymeric substrates of said thermal history sensor include different compositions, wherein said polymeric substrates of said thermal history sensor respond to thermal exposures with different changes in crystallinity.

2. The thermal history sensor of claim 1, further comprising an attachment means for securing said thermal history sensor adjacent to the item.

3. The thermal history sensor of claim 2, wherein said attachment means includes an adhesive strip.

4. The thermal history sensor of claim 2, wherein said attachment means is disposable and removable from said polymeric substrates.

5. The thermal history sensor of claim 1, further comprising an IR reflective mounting surface, positioned under said polymeric substrates, for reflecting a beam of infrared light transmitted through said polymeric substrates back through same said polymeric substrates.

6. The thermal history sensor of claim 1, further comprising a reflective mounting surface, positioned under said polymeric substrates, for reflecting visual light transmitted through said polymeric substrates back through same said polymeric substrates.

7. The thermal history sensor of claim 1, wherein said polymeric substrates are aligned in a predetermined array within the same plane.

8. The thermal history sensor of claim 1, wherein said thermal history sensor comprises at least 4 and no more than 36 of said polymeric substrates.

9. A thermal history sensor, comprising a plurality of polymeric substrates positioned adjacent to an item, wherein each said polymeric substrate has a composition different from every other said polymeric substrate whereby each said polymeric substrate responds to thermal exposure with a unique change in crystallinity.

10. The thermal history sensor of claim 9, further comprising a reflective mounting surface positioned under said polymeric substrates for reflecting infrared (IR) radiation transmitted through said polymeric substrates back through same said polymeric substrates.

11. The thermal history sensor of claim 9, further comprising a reflective mounting surface positioned under said polymeric substrates for reflecting visual light transmitted through said polymeric substrates back through same said polymeric substrates.

12. The thermal history sensor of claim 9, wherein said thermal history sensor comprises at least 3 and not more than 36 said polymeric substrates aligned in a predetermined array within the same plane.

13. The thermal history sensor of claim 9, wherein said reflective mounting surface comprises an attachment means for securing said thermal history sensor to the item.

14. A method for obtaining the thermal history of an item, comprising:

positioning at least one thermal history sensor adjacent to the item, wherein said thermal history sensor comprises a plurality of polymeric substrates having different compositions;

exposing the item and said thermal history sensor to a set of thermal stressors;

measuring changes in the material properties of said polymeric substrates;

combining the measurements of changes in the material properties of each of said polymeric substrates to form a thermal history fingerprint;

comparing the thermal history fingerprint to baseline data for the item.

15. The method for obtaining the thermal history of an item according to claim 14, wherein said step of measuring changes in the material properties of said polymeric substrates comprises the measurement of infrared (IR) absorption spectra of said polymeric substrates.

16. The method for obtaining the thermal history of an item according to claim 14, wherein said step of measuring changes in the material properties of said polymeric substrates comprises the measurement of visual transmittance through said polymeric substrates.

17. The method for obtaining the thermal history of an item according to claim 14, wherein said step of measuring changes in the material properties of said polymeric substrates comprises the measuring of the visual absorption spectra of said polymeric substrates.

18. The method for obtaining the thermal history of an item according to claim 15, wherein said step of measuring the infrared (IR) absorption spectra of said polymeric substrates includes the positioning of an infrared (IR) reflective mounting surface adjacent to said polymeric substrates wherein a beam of IR radiation transmitted at specific angles through said polymeric substrates is reflected back through said same polymeric substrates.

19. The method for obtaining the thermal history of an item according to claim 14, wherein said step of positioning said thermal history sensor adjacent to the item further comprises the step of attaching said thermal history sensor to the item.

20. The method for obtaining the thermal history of an item according to claim 14, wherein said step of positioning said thermal history sensor adjacent to the item further comprises the step of aligning said plurality of polymeric substrates into a predetermined array within the same plane.

* * * * *